(12) United States Patent
Kraemer

(10) Patent No.: US 8,207,629 B2
(45) Date of Patent: Jun. 26, 2012

(54) TRANSFORMER

(75) Inventor: Marco Kraemer, Wolpertshausen (DE)

(73) Assignee: RECARO Aircraft Seating GmbH & Co. KG, Schwäbisch Hall (DE)

(*) Notice: Subject to any disclaimer, the term of this patent is extended or adjusted under 35 U.S.C. 154(b) by 0 days.

(21) Appl. No.: 12/523,596

(22) PCT Filed: Jan. 9, 2008

(86) PCT No.: PCT/EP2008/000087
§ 371 (c)(1),
(2), (4) Date: Jul. 17, 2009

(87) PCT Pub. No.: WO2008/086960
PCT Pub. Date: Jul. 24, 2008

(65) Prior Publication Data
US 2009/0302987 A1 Dec. 10, 2009

(30) Foreign Application Priority Data
Jan. 20, 2007 (DE) .......................... 10 2007 003 043

(51) Int. Cl.
*H02J 3/14* (2006.01)
*H02J 1/10* (2006.01)
*H01F 17/00* (2006.01)

(52) U.S. Cl. ................ 307/32; 307/31; 307/38; 307/29; 336/105

(58) Field of Classification Search .......................... None
See application file for complete search history.

(56) References Cited

U.S. PATENT DOCUMENTS

| | | | | | |
|---|---|---|---|---|---|
| 2,687,580 | A | * | 8/1954 | Dehmel | 434/55 |
| 2,846,637 | A | * | 8/1958 | Huge | 363/77 |
| 2,849,673 | A | * | 8/1958 | Hubbard | 331/113 A |
| 3,716,866 | A | * | 2/1973 | Mason | 342/33 |
| 4,030,208 | A | * | 6/1977 | Carver et al. | 434/46 |
| 4,313,208 | A | * | 1/1982 | Kavenik | 455/42 |
| 4,428,078 | A | * | 1/1984 | Kuo | 455/3.06 |
| 4,736,452 | A | * | 4/1988 | Daniels et al. | 455/41.1 |
| 4,833,338 | A | * | 5/1989 | Bartlett et al. | 307/17 |
| 5,483,464 | A | * | 1/1996 | Song | 713/300 |
| 6,016,016 | A | * | 1/2000 | Starke et al. | 307/9.1 |
| RE38,082 | E | * | 4/2003 | Vlahu | 336/69 |
| 6,601,798 | B2 | * | 8/2003 | Cawley | 244/118.6 |
| 6,921,987 | B2 | * | 7/2005 | Marin-Martinod | 307/32 |

(Continued)

FOREIGN PATENT DOCUMENTS

DE 101 15 523 A1 10/2002

(Continued)

OTHER PUBLICATIONS

International Search Report mailed on May 8, 2008 for the corresponding International patent application No. PCT/EP2008/000087 (English translation enclosed).

(Continued)

*Primary Examiner* — Anh Mai
*Assistant Examiner* — Mangtin Lian
(74) *Attorney, Agent, or Firm* — Posz Law Group, PLC

(57) ABSTRACT

A transformer, particularly a seat transformer, for a sitting device, comprising at least one transformation unit, which has at least one input and at least one output. According to the invention, the transformation unit is provided for transforming a low voltage present at the input.

8 Claims, 2 Drawing Sheets

U.S. PATENT DOCUMENTS

| | | | |
|---|---|---|---|
| 6,951,268 B2 * | 10/2005 | Guettler | 191/10 |
| 7,036,889 B2 * | 5/2006 | Sanfrod et al. | 297/463.2 |
| 7,172,155 B2 * | 2/2007 | Feist et al. | 244/118.6 |
| 2004/0189251 A1 | 9/2004 | Kutkut et al. | |
| 2007/0132220 A1 * | 6/2007 | Breed et al. | 280/735 |

FOREIGN PATENT DOCUMENTS

| | | |
|---|---|---|
| DE | 102 13 261 A1 | 11/2002 |
| EP | 1028512 A2 | 8/2000 |
| WO | WO 02/18207 A1 | 3/2002 |
| WO | WO 02/067403 A | 8/2002 |
| WO | WO 03/091101 A1 | 11/2003 |

OTHER PUBLICATIONS

German Search Report mailed on Dec. 5, 2007 for the corresponding German patent application No. 10 2007 003 043.8 (German language report enclosed).

\* cited by examiner

TRANSFORMER

CROSS REFERENCE TO RELATED APPLICATIONS

This application is a U.S. national stage application of PCT/EP2008/000087 filed on Jan. 9, 2008, and claims priority to, and incorporates by reference, German patent application No. 10 2007 003 043.8 filed on Jan. 20, 2007.

BACKGROUND

The invention is based on a transformer.

Seat transformers which are arranged inside a seat and have a transformation unit which has an input and an output and is intended to transform an AC voltage of 115 V at 400 Hz, which is applied to the input, into a DC voltage of 24 V are already known.

SUMMARY

The invention is based on a transformer, in particular a seat transformer, for a seat, having at least one transformation unit which has at least one input and at least one output.

It is proposed that the transformation unit is intended to transform a low voltage applied to the input. In this case, a low voltage is supposed to be understood as meaning, in particular, a voltage of less than 50 V and, in particular, a DC voltage. The term "intended" is supposed to be understood as meaning, in particular, "specially designed", "equipped" and/or "programmed". Furthermore, a "seat transformer" is supposed to be understood as meaning, in particular, a unit which is integrated inside a seat, in particular inside an aircraft seat, or is specially designed for appropriate integration.

A corresponding refinement according to the invention makes it possible to at least reduce high-voltage lines inside a seat.

Furthermore, it is proposed that the transformer has at least one processor unit. In this case, a "processor unit" is supposed to be understood as meaning, in particular, a unit having a processor or a computation unit and a memory unit which stores an operating program. A processor unit makes it possible to advantageously increase the flexibility of the transformer, to be precise particularly if the transformer has at least one data interface, that is to say a data input interface and/or a data output interface via which different data which appear to be useful to a person skilled in the art can be supplied to the transformer and/or can be retrieved from the latter, for example control data, monitoring data, diagnostic data etc. The data interface allows online monitoring, diagnosis and/or control etc. In this case, the data interface can be designed for data transmission with and/or else without a line or for wireless transmission, for example by radio.

Another refinement proposes that the transformer has an input and/or output unit, in which case an "input and/or output unit" is supposed to be understood as meaning, in particular, a unit which is specifically designed to allow an end user, for example a passenger sitting on the seat and/or a person looking after a passenger sitting on the seat, to make an input, in particular a selection and/or a data input, and to allow data to be output to an end user. An appropriate input unit makes it possible to specifically adapt the transformer to current boundary parameters, to be precise particularly if the input unit is intended to select an output variable, for example an output voltage, such as a DC or an AC voltage, an output frequency etc. In particular, it is also possible to specifically integrate a disconnection function in order to avoid undesirable use.

It is also proposed that the transformation unit is at least partially integrated in an output connection unit. In this case, an "output connection unit" is supposed to be understood as meaning, in particular, a unit which is intended to allow an end user to connect an electrical load and, in particular, to have connection means for this. Furthermore, the term "integrated" is supposed to be understood as meaning, in particular, that the transformation unit is at least partially integrally formed with the output connection unit and/or forms an assembly unit with the latter. An appropriate refinement makes it possible to save on additional components, weight, assembly and/or costs.

If the processor unit is intended to set a characteristic variable in at least partially automated fashion on the basis of at least one parameter, in particular an output variable, comfort can be increased further and, in particular, power consumption can be optimized, to be precise preferably by virtue of the fact that power consumption peaks can be counteracted in at least partially automated fashion. The processor unit can advantageously be intended to limit power tapping from a particular level of the latter by supplying power only in clocked fashion etc.

If the transformer is coupled to a seat control unit, to be precise particularly in terms of data technology, current parameters of the seat control unit can advantageously be taken into account in the transformer and/or current parameters in the transformer can be advantageously taken into account in the seat controller.

If the transformer is at least partially integrally formed with a seat control unit, it is again possible to save on additional components, weight, assembly and/or costs.

BRIEF DESCRIPTION OF THE DRAWINGS

Further advantages emerge from the following description of the drawings. The drawings illustrate one exemplary embodiment of the invention. The drawings, the description and the claims contain numerous features in combination. A person skilled in the art will expediently also consider the features individually and will combine them to form expedient further combinations.

In the drawings.

DETAILED DESCRIPTION

Figure 1:
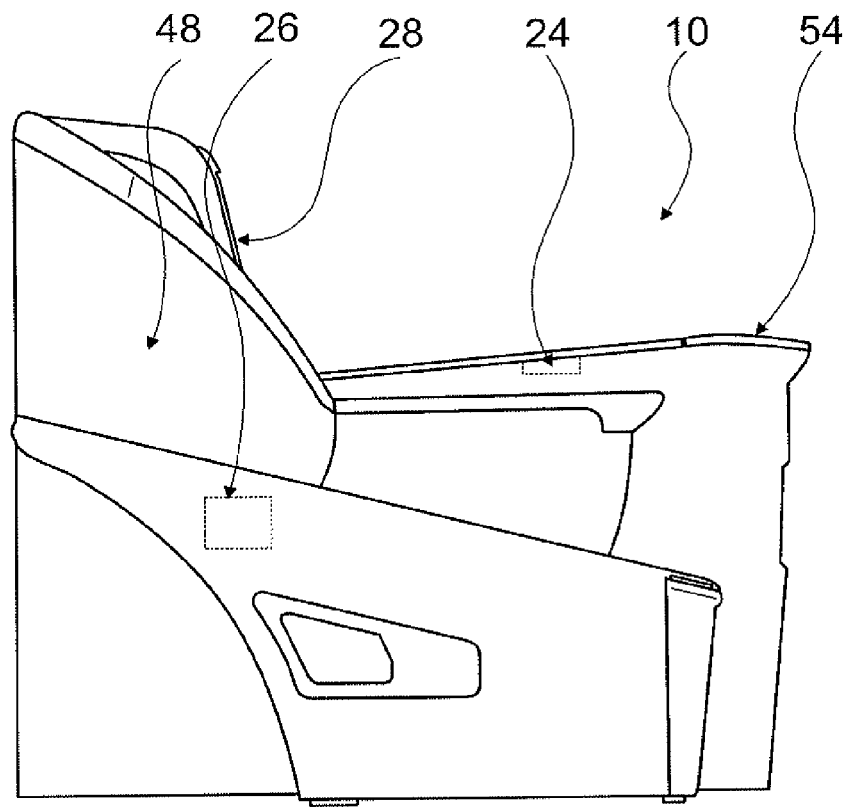
FIG. 1 shows a side view of a diagrammatically illustrated aircraft seat.
Figure 2:
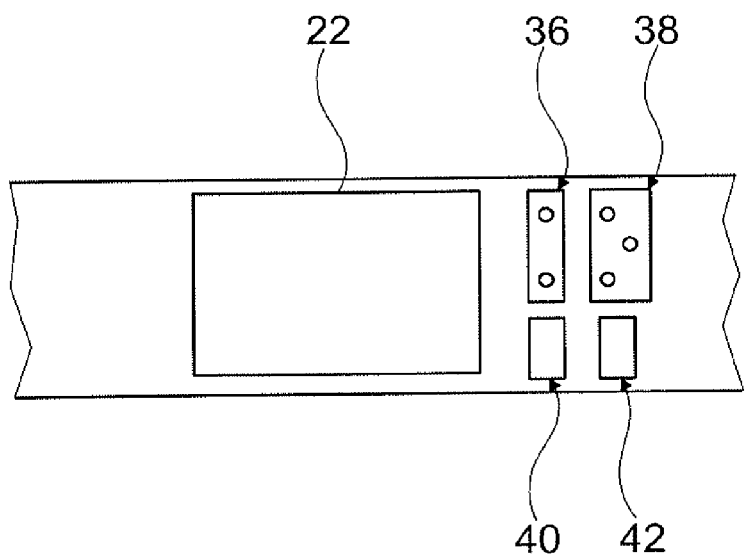
FIG. 2 shows an enlarged section of a console in the seat from FIG. 1 from above.
Figure 3:
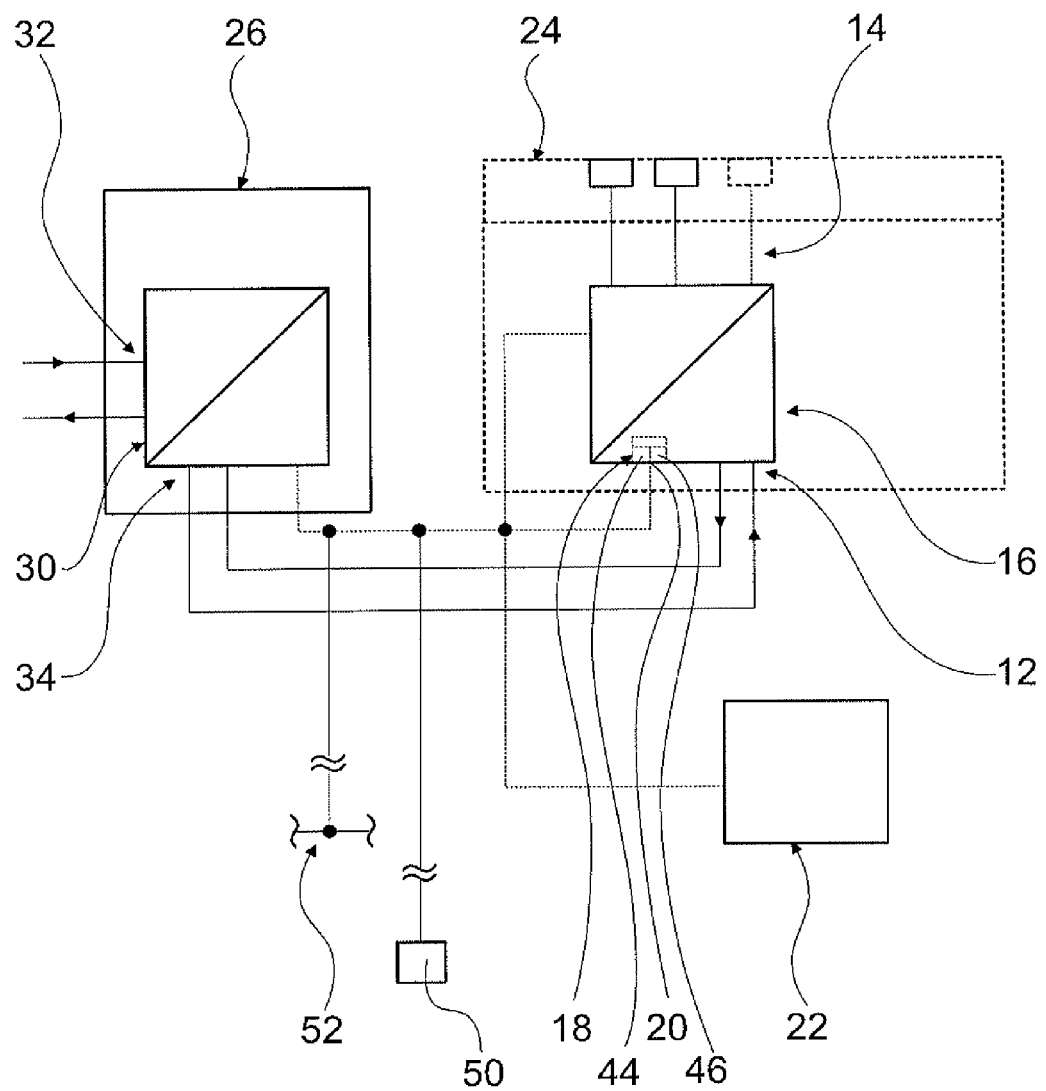
FIG. 3 shows a diagrammatic illustration of a seat transformer and a seat control unit of the seat from FIG. 1.

FIG. 1 shows a side view of an aircraft seat 10 having a seat structure 48 inside which a backrest 28 and a seat base (not illustrated in any more detail) are arranged. The seat 10 comprises a console 54 and an output connection unit 24 which is integrated in the latter and has connection points 36-42 for electrical loads belonging to passengers (FIGS. 1 to 3). A transformation unit 16 of a seat transformer according to the invention is in turn integrated in the output connection unit 24 or the transformation unit 16 is arranged in a housing of the output connection unit 24 and the output connection unit 24 forms an assembly unit with the transformation unit 16. The transformer is connected to cable harnesses which are intended for actuators which can be used to adjust the seat.

The transformation unit 16 has an input and a plurality of outputs 14 and is intended to transform a low voltage applied to the input 12. The transformation unit 16 is coupled to a seat control unit 26 which is intended, in particular, to control movement of the seat base and the backrest 28. A transformation unit 30 having an input 32 and an output 34 is integrated in the seat control unit 26. An AC voltage of 115 V at 400 Hz is applied to the input 32, the transformation unit 30 transforming the AC voltage into a DC voltage of 24 V which is in turn applied to the input 12 of the transformation unit 16.

The transformation unit 16 comprises a processor unit 18 having a processor 44 and a memory unit 46 with an operating program stored therein, and a data interface 20. The data interface 20 and data lines are used to couple the transformation unit 16 to an input and output unit 22 of the transformer, said input and output unit being formed by a touchscreen or by a touch-sensitive screen, being integrated in the output connection unit 24 and making it possible for an end user, in particular a passenger, to select output variables such as voltage level, type of voltage, that is to say DC voltage or AC voltage, and a desired frequency for the connection points 36, 38, 40, 42 from a menu. The selected output variables are then set under processor control using the processor unit 18. Information relating to the transformation unit 16, in particular relating to possible voltages which can be selected, is also output to the passenger via the input and output unit 22.

The transformation unit 16 is also connected to the seat control unit 26, to a central input and output unit 50 inside the aircraft and to an aircraft data bus system 52 via the data interface 20 and data lines.

The input and output unit 50 which is intended to be operated by an end user, to be precise particularly by a person looking after passengers, can be used by the person looking after the passengers to see data relating to the transformation unit 16 and to make settings. In particular, it is also possible to prevent power being delivered.

The processor unit 18 is also used to set characteristic variables in automated fashion and on the basis of parameters, to be precise possible delivery of power is set, in particular, on the basis of the current power consumption of the seat 10 and on the basis of the current power consumption inside an aircraft cabin of the aircraft. If there is a high power consumption, for example when a large number of actuators are driven using the seat control unit 26, power is delivered only in clocked fashion, for example at a connection point for a laptop. If the power consumption exceeds a particular level, the delivery of power is prevented completely. Data for the automated setting operation are supplied to the processor unit 18 via the data interface 20. If the delivery of power is clocked or prevented completely, the processor unit 18 outputs corresponding information to the passenger via the input and output unit 22.

The invention claimed is:

1. A seat control system for controlling and powering a seat comprising:
   a seat control unit provided for controlling seat movements, having a first transformation unit with a first input and a first output, that is configured to transform a voltage applied to the first input into a DC voltage at the first output;
   a transformer, having a second transformation unit, the second transformation unit including a second input and a second output, a processor unit, and a data interface; and
   a central input and output unit, which is connected to the second transformation unit via the data interface, wherein
   the second transformation unit transforms the DC voltage applied to the second input from the first output of the first transformation unit, and
   the central input and output unit receives data related to the second transformation unit and establishes settings regarding the second transformation unit.

2. The seat control system for controlling and powering a seat as claimed in claim 1, wherein
   the second transformation unit is at least partially integrated in an output connection unit.

3. The seat control system for controlling and powering a seat as claimed in claim 1, wherein
   the processor unit is configured to set a characteristic variable of the second transformation unit in at least a partially automated fashion on the basis of at least one parameter.

4. The seat control system for controlling and powering a seat as claimed in claim 1, wherein
   a provision of power at the second transformation unit can be prevented by at least one setting established by the central input and output unit.

5. The seat control system for controlling and powering a seat as claimed in claim 1, wherein
   the second transformation unit has an input and output unit; and
   the input and output unit is operated to select and monitor output variables of the second transformation unit, including a voltage level, type of voltage, and a desired frequency.

6. The seat control system for controlling and powering a seat as claimed in claim 1, wherein
   the seat is an aircraft seat.

7. The seat control system for controlling and powering a seat as claimed in claim 1, wherein
   the seat comprises a console in which the second transformation unit is integrated.

8. The seat control system for controlling and powering a seat as claimed in claim 3, wherein the at least one parameter includes current power consumption.

* * * * *